United States Patent [19]

Cook

[11] 4,303,937
[45] Dec. 1, 1981

[54] COMMUNICATION SYSTEM FOR SUPPLEMENTING OFF-AIR OR CABLE TV SIGNALS WITH LOCALLY GENERATED VIDEO MESSAGES

[76] Inventor: Tommy D. Cook, 302 Sutton Bridge Rd., Apartment #210, Gadsden, Ala. 35901

[21] Appl. No.: 61,857

[22] Filed: Jul. 30, 1979

[51] Int. Cl.³ .............................................. H04N 7/10
[52] U.S. Cl. ...................................................... 358/86
[58] Field of Search ................................. 358/86, 183; 179/100.1 C

[56] References Cited

U.S. PATENT DOCUMENTS

| | | |
|---|---|---|
| 2,628,275 | 2/1953 | Parker . |
| 3,244,809 | 4/1966 | Fuller et al. |
| 3,796,829 | 3/1972 | Gray . |
| 3,825,947 | 7/1974 | Rubin et al. ................. 179/100.1 C |
| 3,916,091 | 10/1975 | Kirk, Jr. et al. |
| 3,975,585 | 8/1976 | Kirk, Jr. et al. ...................... 358/86 |
| 4,008,369 | 2/1977 | Theurer et al. ........................ 358/86 |
| 4,035,838 | 7/1977 | Bassani et al. . |

Primary Examiner—Richard Murray
Attorney, Agent, or Firm—Saidman & Sterne

[57] ABSTRACT

A communication system which supplements a hotel's in-house cable or off-air TV signal distribution network for permitting locally originated video messages, which may be commercial in nature, to automatically interrupt the regular TV signals on each of the TV receivers in the rooms of the hotel. The local signal may be generated by means of pre-recorded tapes played on a video tape player or, alternatively, may be generated from a live broadcast using a TV camera located, for example, in the lounge of the hotel. The locally generated TV signal, which is of a predetermined frequency, is frequency converted into as many frequencies as may be received by the TV receivers in the hotel establishment. An electronic timer may automatically and periodically interrupt the regular TV signals being received with the locally generated signal for a predetermined time period which may be set, for example, to correspond with the regular network commercial interruptions.

17 Claims, 1 Drawing Figure

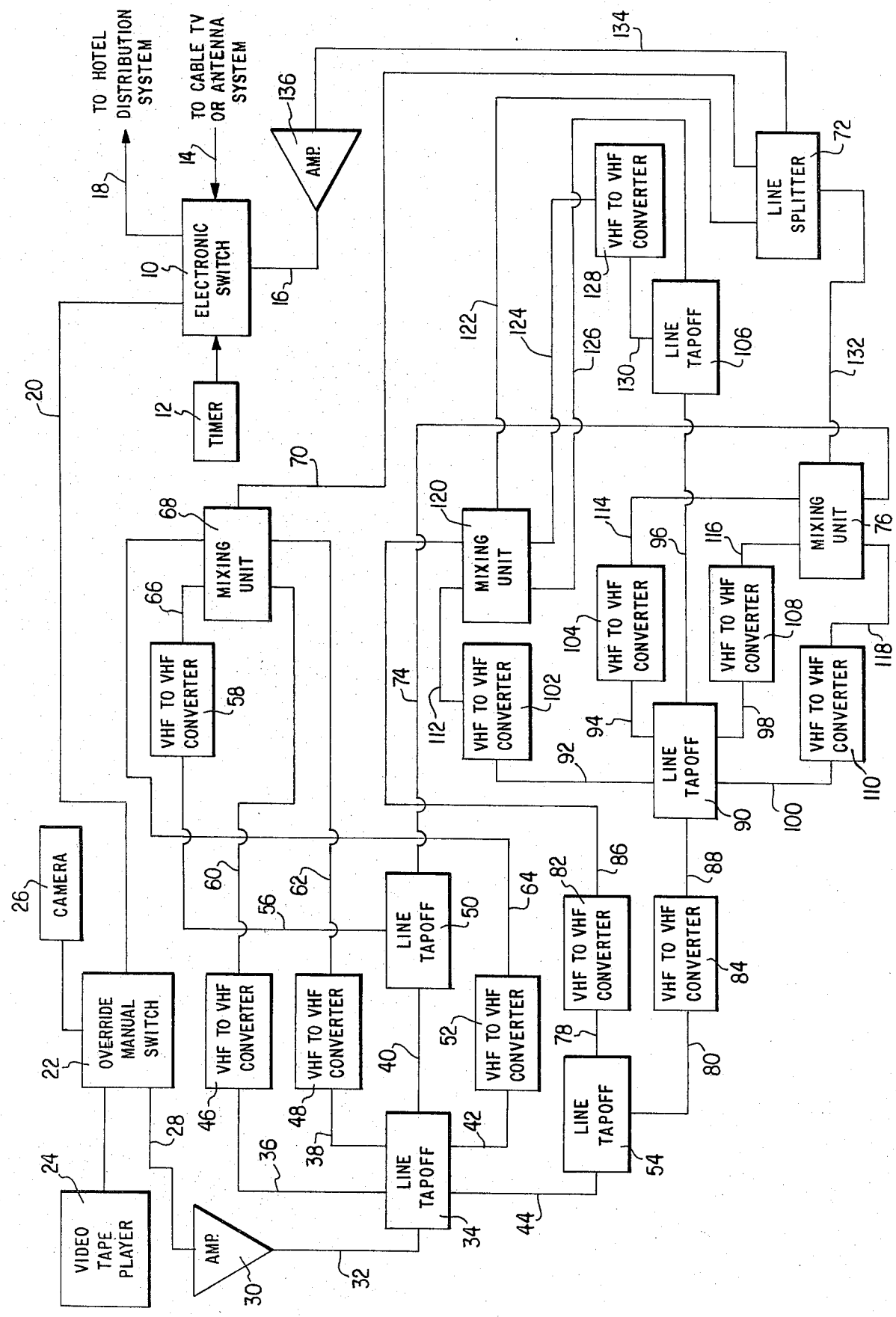

COMMUNICATION SYSTEM FOR SUPPLEMENTING OFF-AIR OR CABLE TV SIGNALS WITH LOCALLY GENERATED VIDEO MESSAGES

BACKGROUND OF THE INVENTION

1. Field of the Invention

The present invention is related to communication systems and, more particularly, is directed toward a TV signal system adapted to be utilized in a hotel or similar lodging establishment wherein a plurality of TV receivers are located in the individual rooms and are adapted to receive any one of a number of TV programs via either a cable distribution network or an antenna distribution system.

2. Description of the Prior Art

It is today quite common for a hotel or other similar lodging establishment to provide each guest room with a TV receiver. The programs which may be viewed on such receivers are of the normal broadcast variety which originate at a TV network or station located externally of the lodging facility. The facility may be equipped either with a master antenna for receiving off-air broadcast signals, or a cable for receiving cable TV signals. The master antenna or cable is then fed through an internal TV signal distribution system by means of which each guest may select a particular channel or program for viewing on his individual TV receiver.

It has come to my attention that the owners of such hotel establishments or the like would find it highly desirable if some means could be provided whereby a locally generated commercial message could be displayed on the TV receivers located in each guest's room. Such locally generated audio/visual messages could consist, for example, of commercial information subscribed to by local merchants. Alternatively, the owner of the hotel establishment may wish to bring to the attention of the guests the availability of services or facilities within his own establishment, which otherwise the guest may not be aware of. Also, such locally generated messages may consist of product information subscribed to by national marketing or manufacturing organizations or the like.

In order to make such information available on the regular TV receivers located in each room of the establishment, the locally generated signals must be developed in any of the plurality of frequencies tunable on a given receiver in order that the message can be received on the receiver regardless of which channel the receiver is tuned to. Further, it would be highly desirable if some means could be provided whereby the locally generated messages would override or interrupt the remotely generated TV signals during periodic intervals and for predetermined times when the remotely generated TV signals are carrying their normal commercial messages. Some means is also desired for permitting an owner or operator of the system to locally interrupt the normal remotely generated TV signal at any given time for any given length of time, as may be desired.

Although I am aware of several prior art United States Patents which relate to this general area (e.g., U.S. Pat. Nos. 2,628,275; 3,244,809; 3,796,829; 3,916,091; and 4,035,838), in my opinion such systems are unduly complex and expensive, and do not lend themselves to easy adaptation within existing hotel TV signal distribution systems. It is toward overcoming these disadvantages and achieving the above and later noted objects that the present invention is advanced.

OBJECTS OF THE INVENTION

It is therefore a primary object of the present invention to provide a communication system which may be easily installed and integrated with an existing TV signal distribution system in a hotel establishment or similar facility, and which permits the hotel owner or operator to either automatically or manually interrupt regular TV signals on each TV receiver in the hotel in order to present locally generated audio/visual messages.

Another object of the present invention is to provide a system for permitting locally generated TV signals to be selectively played on TV receivers located in the rooms of a hotel or similar establishment, and which is inexpensive, may be readily constructed from available components, does not require modification of the existing TV signal distribution system, and which will find a wide market.

A still further object of the present invention is to provide a non-complex method and apparatus for automatically interrupting regular TV programming on the TV receivers of a hotel or similar establishment with either pre-recorded or live audio/visual information that originates locally from the hotel establishment.

SUMMARY OF THE INVENTION

The foregoing and other objects are attained in accordance with one aspect of the present invention through the provision of apparatus for use in combination with a TV signal distribution system in a hotel or similar facility wherein externally originated TV signals of a plurality of different predetermined frequencies are fed to a plurality of TV receivers located in the rooms of the hotel or the like, each of the TV receivers being capable of receiving one of the TV signals at a time. The apparatus comprises means for generating a local TV signal having a predetermined frequency within the hotel facility, means for converting the frequency of the local TV signal into a plurality of local TV signals which respectively have a frequency corresponding to the plurality of different predetermined frequencies receivable by the plurality of TV receivers, and means for selectively interrupting the reception of the externally originated TV signals on the plurality of TV receivers and for causing the plurality of local TV signals to be displayed thereon.

In accordance with one aspect of the present invention, the means for generating a local TV signal within the hotel facility may comprise a video tape player. Alternatively, such means may comprise a TV camera located, for example, in the lounge or disco of the facility for conveying real time, live action to the rooms of the hotel.

The means for selectively interrupting the reception of the externally originated TV signals may comprise switch means having an output connected to the plurality of TV receivers and receiving as inputs the externally originated TV signals and the local TV signals, and timer means connected to the switch means for periodically causing the local TV signals to be fed to the output of the switch means. The apparatus may also include manually operable switch means connected to the switch means mentioned above for permitting the local TV signals to be fed to the output at any time desired by the user.

In accordance with more specific aspects of the present invention, the means for converting the frequency of the local TV signal into a plurality of local TV signals comprises a plurality of VHF-to-VHF converters each connected to receive the local TV signal having the predetermined frequency and to convert same to one of the plurality of local TV signals.

In accordance with another aspect of the present invention, the apparatus further comprises means for combining the plurality of local TV signals from the plurality of VHF-to-VHF converters onto a single line connected to the switch means. The means for combining more particularly may comprise a plurality of mixing units each connected to receive certain of the plurality of local TV signals for providing a combination of same on its respective output line. The combining means further preferably comprises a line splitter connected to receive the signals from the output lines of the plurality of mixing units and to provide as its output the local TV signals on the single line.

In accordance with yet more detailed aspects of the present invention, the apparatus may further include first amplifier means connected to receive and amplify the local TV signal and feed same to the plurality of VHF-to-VHF converters, and second amplifier means connected to receive and amplify the plurality of local TV signals from the single line and feed same to the switch means.

In accordance with yet another aspect of the present invention, there is provided a method of automatically providing locally originated TV signals to a plurality of TV receivers normally adapted to receive a plurality of externally generated different frequency TV signals via a locally installed signal distribution system, comprising the steps of feeding the externally generated TV signals and the locally originated TV signals to electronic switch means whose output is fed to the plurality of TV receivers, and controlling the switch means to automatically feed the locally generated TV signals to the plurality of TV receivers in lieu of the externally generated TV signals at predetermined time intervals and for predetermined periods of time.

The step of feeding the locally originated TV signals to electronic switch means may include the steps of originating a local TV signal at a predetermined frequency, converting the frequency of the local TV signal into a plurality of local TV signals having different frequencies all capable of being received by the TV receivers, combining the plurality of local TV signals onto a single line, and connecting the single line to the electronic switch means. The step of originating a local TV signal may include the step of operating a video tape player to play a pre-recorded video TV signal at the predetermined frequency, or, alternately, operating a locally installed TV camera to generate a live, real time TV signal at the predetermined frequency. The method may further include the step of manually overriding the electronic switch means at any desired time to cause the locally originated TV signals to be fed to the plurality of TV receivers.

BRIEF DESCRIPTION OF THE DRAWING

Various objects, features and attendant advantages of the present invention will be more fully appreciated as the same becomes better understood from the following detailed description of the present invention when considered in connection with the accompanying drawing, in which the sole drawing figure is a block diagram of the components which comprise a preferred embodiment of the present invention.

DETAILED DESCRIPTION OF THE PREFERRED EMBODIMENT

Referring now to the sole drawing figure, reference numeral 10 indicates an electronic switch which is generally found in the signal distribution system of a hotel establishment's TV signal network. The switch 10 normally receives "regular" TV signals, at any of a plurality of different frequencies, from line 14 which is connected to the hotel's master antenna or cable TV hookup, whichever the case may be. Such "regular" TV signals are normally fed through the switch 10 via output line 18 to the hotel's signal distribution system that transmits such signals to a plurality of individual TV receivers, one usually located in each room of the establishment. Each such TV receiver may be tuned by the guest to receive one of the available TV signals being input on line 14.

In accordance with the present invention, electronic switch 10 operates under the control of a timer 12 which automatically and periodically interrupts the transmission of the "regular" TV signals from line 14 to line 18. During such interruptions, locally generated TV signals, to be described in greater detail hereinafter, appearing on line 16 are fed through switch 10 to output line 18, and subsequently to each individual TV receiver. The timer 12 may be preset to interrupt the normal TV signals from line 14 at intervals which correspond to the times when commercial broadcasting or the like is normally being transmitted. During such time periods, the present invention contemplates that locally generated audio/visual information, which may be in the form of commercial messages or the like, are transmitted to the individual TV receivers via lines 16 and 18.

Clearly, since the individual TV receivers in the rooms of the establishment may be tuned to any of a number of different frequency channels, the information delivered on line 16 must also be capable of being received on whichever of such channels that the individual TV receivers happen to be tuned to.

A manually operable switch 22, which may be, for example, under the control of a desk clerk or video system operator, is connected to switch 10 via line 20. Manual switch 22 has the capability of overriding timer 12 to interrupt the externally generated "regular" TV signals received along line 14 at any time desired by the operator in order to display the locally generated signals from line 16.

Switch 22 also serves as a selector switch for selecting the source of local programming to be either from a standard video tape player 24 or a standard TV camera 26. Video tape player 24 may be selected to play pre-recorded audio/visual messages, information, commercials or the like, and may comprise any of the well-known video tape players currently on the market. As an alternative to playing pre-recorded information from tape player 24, the owner/operator may deem it advantageous to broadcast live, on-the-spot programs via camera 26 which may be positioned, for example, in the lounge or bar of the hotel establishment. Such a feature would presumably induce those guests viewing the broadcast in their rooms to patronize the lounge, bar or the like of the hotel establishment.

Both tape player 24 and camera 26 each generate a standard TV signal on a preselected frequency, e.g., the frequency of channel 4, which is one of the frequencies receivable on the TV receivers located in the rooms of the establishment.

Switch 22 feeds the locally generated TV signal from tape player 24 or camera 26 to output line 28 to an amplifier 30 which, for example, provides a 30 dB. amplified output on line 32.

The amplified TV signal on line 32 is fed to a first line tap-off 34 which serves to deliver the same TV signal on line 32 to each of five output lines 36, 38, 40, 42 and 44.

Lines 36, 38 and 42 are each connected to a VHF-to-VHF converter 46, 48 and 52 respectively which convert the frequency of the signal on lines 36, 38 and 42 to three different frequency signals on lines 60, 62 and 64, respectively. By way of example, which will be utilized hereinafter, if the locally generated TV signal is of a frequency corresponding to channel 4, the converters 46, 48 and 52 serve to deliver the same TV signal on lines 60, 62 and 64, but at frequencies which correspond to channels 7, 8 and 9, respectively.

Lines 60, 62 and 64 are each connected as inputs to a mixing unit 68 which preferably comprises a tunable bandpass filter for combining the input signals while filtering out any interfering frequencies.

The channel 4 signal on line 40 is fed to a second line tap-off 50 having two output lines 56 and 74. Line 56 feeds the channel 4 signal to another VHF-to-VHF converter 58 which changes the channel 4 frequency signal to, for example, channel 12 on line 66 which is then coupled to mixing unit 68.

Accordingly, mixing unit 68 delivers on its output line 70 four different frequency TV signals of frequencies corresponding to channels 7, 8, 9 and 12, the information thereof corresponding to the original locally generated TV signal from tape player 24 or camera 26.

Output line 74 from tap-off 50 transmits the unconverted channel 4 signal to a second mixing unit 76 which has other inputs to be described in greater detail hereinafter.

The channel 4 TV signal on line 44 is fed to a further line tap-off 54 which has outputs 78 and 80 that are connected respectively to a pair of VHF-to-VHF converters 82 and 84. Converters 82 and 84 convert the channel 4 TV signal to, for example, TV signals having the same information but of frequencies corresponding to channels 10 and 11 on output lines 86 and 88. The channel 10 TV signal on line 86 is fed to a third mixing unit 120 having other inputs to be described in greater detail hereinafter.

The channel 11 TV signal on line 88 is fed to yet another line tap-off 90 which has five output lines 92, 94, 96, 98 and 100, each of which contains the same channel 11 TV signal.

Output line 96 carries the channel 11 TV signal directly to yet another line tap-off 106 having outputs 126 and 130. The channel 11 signal on line 126 is fed directly as another input to mixing unit 120, while the channel 11 signal on line 130 is fed through VHF-to-VHF converter 128 for developing a channel 13 TV signal on line 124. Line 124 is fed as another input to mixing unit 120.

The TV signals having a frequency corresponding to channel 11 on lines 92, 94, 98 and 100 are fed respectively to VHF-to-VHF converters 102, 104, 108 and 110 which alter the frequency of the signal to, for example, that of channels 2, 3, 5 and 6 on respective output lines 112, 114, 116 and 118.

Mixing unit 120 therefore receives a channel 2 TV signal via line 112, a channel 10 TV signal via line 86, a channel 13 TV signal via line 124, and a channel 11 TV signal via line 126. Mixing unit 120 therefore serves to deliver on its output line 122 four TV signals representing the same information but having frequencies corresponding to channels 2, 10, 11 and 13.

Output lines 114, 116 and 118 from converters 104, 108 and 110, respectively, are mixed with the channel 4 TV signal on line 74 in mixing unit 76 that delivers on its output line 132 four TV signals representing the same information, but having frequencies corresponding to channels 3, 4, 5 and 6.

Output lines 70, 122 and 132 from mixing units 68, 120 and 76, respectively, therefore containing twelve different frequency TV signals, all containing the same information, but having frequencies corresponding to commercial VHF channels 2 through 13, inclusive. Lines 70, 122 and 132 are each connected as inputs to a line splitter 72 which combines the input signals from lines 70, 122 and 132 into a common coaxial cable output line 134.

Output line 134 therefore contains a plurality of different frequency TV signals, all locally generated and containing the information corresponding to the locally generated audio/visual information, and is connected to another amplifier 136 for providing desired gain to the TV signals. The output of amplifier 136 consists of the twelve TV signals on line 16 which are periodically delivered via switch 10, timer 12 and/or manual switch 22 to output 18 for distribution to the various TV receivers in the establishment.

It may be appreciated that the example set forth above is for the most general case where the TV receivers in the guest's rooms are capable of receiving externally generated TV signals on any one of the channels 2 through 13. In a particular locality, however, it may be appreciated that only a few of such signals will be available, e.g., channels 4, 5, 7 and 9. In such a case, a fewer number of converters and corresponding components would be necessary. In other words, the present invention may be customized for the particular locality in which it will be utilized, thereby saving greatly on required hardware and costs.

Following is a list of commercially available components which may be utilized for the preferred embodiment of the present invention set forth above. It should be understood, however, that many equivalent parts and components are available, and the following list is intended to be exemplary only, and not limiting in any way.

| Component | Part Number |
| --- | --- |
| Amplifiers 30 and 136 | Channel Master 7334 |
| Line Tap-Offs 34 and 90 | Channel Master 7237 |
| Line Tap-Offs 50, 54 and 106 | Channel Master 7229 |
| VHF-to-VHF Converters 46, 48, 52, 58, 82, 84, 102, 104, 108, 110, 128 | Channel Master 7084 |
| Mixing Units 68, 76 and 120 | Channel Master 7006 |
| Line Splitter 72 | Channel Master 7143 |
| Timer 12 | General Time Quartz Digital Timer |
| Video Tape Player 24 | Panasonic |

To initiate operation of the system of the present invention, the preset timer 12 is simply turned on. Switch 10 will thereafter automatically be interrupted at the desired time intervals for the desired periods of time to replace the externally generated TV signals from line 14 with the locally generated TV signals from line 16. The switch 22 may be utilized to either override the timer 12, or to switch to "live action" from camera 26.

Obviously, numerous modifications and variations of the present invention are possible in light of the above teachings. It is therefore to be understood that within the scope of the appended claims the invention may be practiced otherwise than as specifically described herein.

I claim as my invention:

1. In combination with a TV signal distribution system in a hotel or similar facility wherein externally originated TV signals of a plurality of different predetermined frequencies are fed to a plurality of TV receivers located in the rooms of the hotel or the like, each said TV receiver being capable of receiving one of said TV signals at a time, apparatus which comprises:
   means for generating a local TV signal having a predetermined frequency within the hotel facility;
   means for converting the frequency of said local TV signal into a plurality of local TV signals which respectively have a frequency corresponding to said plurality of different predetermined frequencies receivable by said plurality of TV receivers; and
   means for selectively interrupting the reception of said externally originated TV signals on said plurality of TV receivers and for causing said plurality of local TV signals to be displayed thereon.

2. The apparatus as set forth in claim 1, wherein said means for generating a local TV signal within the hotel facility comprises a video tape player.

3. The apparatus as set forth in claim 1, wherein said means for generating a local TV signal within the hotel facility comprises a TV camera.

4. The apparatus as set forth in claim 1, wherein said means for selectively interrupting the reception of said externally originated TV signals comprises:
   switch means having an output connected to said plurality of TV receivers and receiving as inputs said externally originated TV signals and said local TV signals; and
   timer means connected to said switch means for periodically causing said local TV signals to be fed to said output.

5. The apparatus as set forth in claim 4, further comprising manually operable switch means connected to said switch means for permitting said local TV signals to be fed to said output at any time desired by the user.

6. The apparatus as set forth in claim 4, wherein said means for converting the frequency of said local TV signal into a plurality of local TV signals comprises a plurality of VHF-to-VHF converters each connected to receive said local TV signal having said predetermined frequency and to convert same to one of said plurality of local TV signals.

7. The apparatus as set forth in claim 6 and further including means for combining certain of said plurality of local TV signals.

8. The apparatus as set forth in claim 7, wherein said means for combining comprises a plurality of mixing units each connected to receive certain of said plurality of local TV signals for providing a combination of same on its respective output line.

9. The apparatus as set forth in claim 8, wherein said means for combining further comprises a line splitter connected to receive the signals from said output lines of said plurality of mixing units and to provide as its output said local TV signals on said single line.

10. The apparatus as set forth in claim 9, further comprising:
    first amplifier means connected to receive and amplify said local TV signal and feed same to said plurality of VHF-to-VHF converters; and
    second amplifier means connected to receive and amplify said plurality of local TV signals from said single line and feed same to said switch means.

11. A method of automatically providing locally originated TV signals to a plurality of TV receivers normally adapted to receive a plurality of externally generated different frequency signals via a locally installed signal distribution system comprising the steps of:
    feeding said externally generated TV signals and said locally originated TV signals to electronic switch means whose output is fed to said plurality of TV receivers; and
    controlling said switch means to automatically feed said locally originated TV signals to said plurality of TV receivers in lieu of said externally generated TV signals at predetermined time intervals and for predetermined periods of time, wherein said step of feeding said locally originated TV signals to electronic switch means includes the steps of:
    originating a local TV signal at a predetermined frequency;
    converting the frequency of said local TV signal into a plurality of local TV signals having different frequencies all capable of being received by said TV receivers;
    combining said plurality of local TV signals onto a single line; and
    connecting said single line to said electronic switch means.

12. A method as set forth in claim 11, wherein said step of originating a local TV signal includes the step of operating a video tape player to play a pre-recorded video TV signal at said predetermined frequency.

13. The method as set for in claim 11, wherein said step of originating a local TV signal includes the step of operating a locally installed TV camera to generate a live, real time TV signal at said predetermined frequency.

14. A method as set forth in claim 11, further comprising the step of manually overriding said electronic switch means at any desired time to cause said locally originated TV signals to be fed to said plurality of TV receivers.

15. For use in a TV signal distribution system in a hotel or other similar facility, wherein externally originated TV signals of discrete different predetermined frequencies corresponding to TV channels are each fed to each of a plurality of TV receivers, a system for substituting a locally originated TV signal on each of said predetermined frequencies comprising:
    means for generating a local TV signal;
    means for producing a plurality of discrete different carrier frequencies respectively corresponding to said plurality of discrete different predetermined frequencies, each of said carrier frequencies being modulated by said local TV signal; and means for interrupting the feed of said externally originated TV signals to said plurality of said TV receivers and feeding said carrier frequencies modulated by said local TV signal to each of said plurality of TV receivers.

16. The invention set forth in claim 15 and further including means for combining all of said modulated carrier frequencies for transmission over a single line.

17. The invention as defined in claim 16 and further including timer means for periodically activating said means for interrupting at predetermined intervals.

* * * * *